United States Patent [19]
Harness

[11] Patent Number: 5,682,498
[45] Date of Patent: Oct. 28, 1997

[54] COMPUTER SYSTEM WITH DUAL PORTED MEMORY CONTROLLER AND CONCURRENT MEMORY REFRESH

[75] Inventor: Jeffrey F. Harness, Hillsboro, Oreg.

[73] Assignee: Intel Corporation, Santa Clara, Calif.

[21] Appl. No.: 643,501

[22] Filed: May 6, 1996

Related U.S. Application Data

[63] Continuation of Ser. No. 152,225, Nov. 12, 1993, abandoned.

[51] Int. Cl.[6] .................................................. G06F 13/14
[52] U.S. Cl. .................... 395/433; 365/222; 364/964.9; 395/431; 395/432; 395/494; 395/495; 395/476; 395/477
[58] Field of Search .................................. 395/432, 433, 395/476, 477, 495, 494, 431, 475; 365/222; 364/964.9

[56] References Cited

U.S. PATENT DOCUMENTS

| | | | |
|---|---|---|---|
| 4,829,467 | 5/1989 | Ogata | 395/732 |
| 4,954,951 | 9/1990 | Hyatt | 395/421.08 |
| 5,072,420 | 12/1991 | Conley et al. | 395/877 |
| 5,184,325 | 2/1993 | Lipovski | 365/189.07 |
| 5,193,193 | 3/1993 | Iyer | 395/297 |
| 5,253,214 | 10/1993 | Hermann | 365/233 |
| 5,255,374 | 10/1993 | Aldereguia et al. | 395/293 |
| 5,265,231 | 11/1993 | Nuwayser | 395/433 |
| 5,276,858 | 1/1994 | Oak et al. | 395/494 |
| 5,317,709 | 5/1994 | Sugimoto | 395/432 |
| 5,345,577 | 9/1994 | Chan et al. | 395/433 |
| 5,418,920 | 5/1995 | Kuddes | 395/433 |

OTHER PUBLICATIONS

Hamacher et al., Computer Organization, 1990, 315–329.
Alan Clements, Microprocessor Systems Design, 1992, pp. 419–452.
"82369 DRAM Controller," Intel Peripheral Components, pp. 1–522 through 1–700 (1993).

*Primary Examiner*—Tod R. Swann
*Assistant Examiner*—Denise Tran
*Attorney, Agent, or Firm*—Blakely, Sokoloff, Taylor & Zafman

[57] ABSTRACT

A memory controller for controlling access to a memory array from a microprocessor and a plurality of devices is described. The memory controller also allows access between the microprocessor and the plurality of devices. The memory controller interfaces the microprocessor and the plurality of devices. The memory controller comprises an interface circuit coupled to the microprocessor and the plurality of devices to receive an access request from one of the microprocessor and the plurality of devices for determining whether the access request is a memory access request for the memory array. A memory control circuit is coupled to the interface circuit for controlling access to the memory array when the access request is the memory access request. A refresh control circuit is coupled to the memory control circuit and the interface circuit for causing the memory control circuit to refresh the memory array when the access request received in the interface circuit is a non-memory access request such that the memory array is refreshed concurrently with handling of the non-memory access request by the interface circuit. A method of causing the memory controller to concurrently refresh the memory array is also described.

14 Claims, 5 Drawing Sheets

COMPUTER SYSTEM WITH DUAL PORTED MEMORY CONTROLLER AND CONCURRENT MEMORY REFRESH

This is a continuation of application Ser. No. 08/152,225, filed Nov. 12, 1993, now abandoned.

FIELD OF THE INVENTION

The present invention pertains to the field of computer systems. More particularly, this invention relates to a computer system that includes a dual ported memory controller that supports concurrent memory refresh such that the memory refresh operation can be hidden and the impact of the refresh operation to the computer system is minimized so that the system performance of the computer system is increased.

BACKGROUND OF THE INVENTION

In a prior microprocessor based computer system having a memory, a microprocessor, and other circuitry, it is necessary for the microprocessor to access the memory for data or codes (i.e., programs). The memory access operation typically involves latching an address to the memory, decoding the address in the memory, and accessing the memory array of the memory in accordance with the address decoded. When the memory is a volatile memory (e.g., a dynamic random access memory), the memory access operation also involves precharging nodes and controlling refreshing, etc. These operations typically introduce wait states in microprocessor operations, which typically costs a considerable amount of processing time of the microprocessor.

One prior solution to the problem is to design a DRAM ("dynamic random access memory") controller that interfaces with the microprocessor and the DRAM device. A prior DRAM controller typically provides complete control and timing for the DRAM device. The microprocessor interfaces with the DRAM controller. Other system bus masters may also interface with the DRAM controller. The DRAM controller decodes CPU to DRAM access commands, translates the microprocessor specified memory address to the proper DRAM row and column address, and generates the proper DRAM control timing signals required to successfully complete the DRAM access cycle.

One other function of the prior DRAM controller is to periodically refresh the DRAM. This is due to the fact that DRAM cell typically loses its electrical charge over a period of time, which may result in the logical content of the cell to change. Therefore, it is necessary to refresh the DRAM cell. The refresh of a DRAM cell typically involves the steps of reading out the content stored in that cell and then writing it back to that cell. During the writing back step of the refresh operation, the cell will be charged above the voltage level representing the content stored.

The refresh operation is typically periodically performed to the DRAM by the prior DRAM controller. A refresh timer is typically provided in the prior computer system to periodically trigger the refresh operation.

One disadvantage of this prior refresh arrangement is that the CPU is typically held off and no bus activity can occur on the system bus during the memory refresh operation. The CPU typically cannot access any of the system devices via the memory controller. In other words, the computer system is not operative when the DRAM controller is refreshing the DRAM in the system. This typically adversely affects the speed and performance of the computer system. In addition, the DRAM controller typically can only perform the refresh operation when the computer system is made idle. This typically causes the system resources to be wasted because sometimes the DRAM controller is idle while other devices of the computer system are not. In this situation, the DRAM controller typically cannot perform the refresh operation to the DRAM in the system even though the DRAM is idle.

SUMMARY AND OBJECTS OF THE INVENTION

One of the objects of the present invention is to increase the system performance of a computer system.

Another object of the present invention is to increase the system performance of the computer system by reducing the impact of refreshing the memory to the computer system.

A further object of the present invention is to increase the system performance of the computer system by providing concurrent memory refresh for the memory of the computer system.

A still further object of the present invention is to allow the memory to be refreshed concurrently with a non-memory access operation of the computer system such that the system performance of the system is improved.

A memory controller for controlling access to a memory array from a microprocessor and a plurality of devices is described. The memory controller also allows access between the microprocessor and the plurality of devices. The memory controller interfaces with the microprocessor and the plurality of devices. The memory controller comprises an interface circuit coupled to the microprocessor and the plurality of devices to receive an access request from one of the microprocessor and the plurality of devices. The memory controller determines whether the access request is a memory access request for the memory array. A memory control circuit is coupled to the interface circuit for controlling access to the memory array when the access request is the memory access request. A refresh control circuit is coupled to the memory control circuit and the interface circuit for causing the memory control circuit to refresh the memory array when the access request received in the interface circuit is a non-memory access request such that the memory array is refreshed concurrently with handling of the non-memory access request by the interface circuit.

A computer system is described. The computer system includes a microprocessor, a memory array, and a plurality of devices. A memory controller interfaces with (1) the memory array, (2) the microprocessor, and (3) the plurality of devices for controlling access to the memory array and for allowing access between the microprocessor and the plurality of devices. The memory controller further comprises an interface circuit coupled to the microprocessor and the plurality of devices to receive an access request from one of the microprocessor and the plurality of devices for determining whether the access request is a memory access request for the memory array. A memory control circuit is coupled to the interface circuit for controlling access to the memory array when the access request is the memory access request. A refresh control circuit is coupled to the memory control circuit for causing the memory control circuit to refresh the memory array when the access request received in the interface circuit is a non-memory access request such that the memory array is refreshed concurrently with handling of the non-memory access request by the interface circuit.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
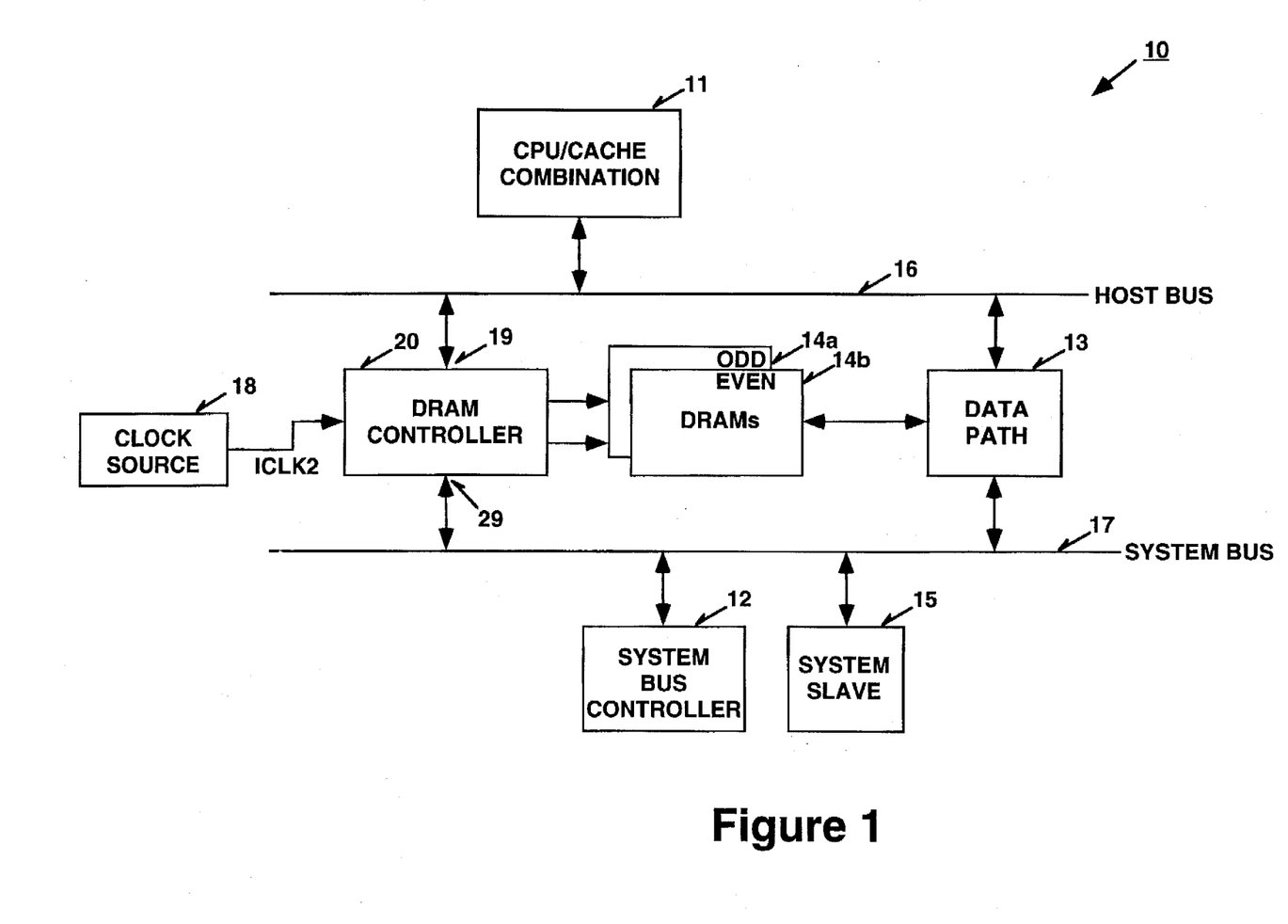
FIG. 1 is a block diagram of a computer system that includes a DRAM controller that implements an embodiment of the present invention.

FIG. 1 illustrates an architecture of a microprocessor based computer system 10, which implements an embodiment of the present invention. FIG. 1 illustrates one configuration of computer system 10.

Referring to FIG. 1, computer system 10 includes a host bus 16 connected to a central processing unit ("CPU") 11. CPU 11 typically comprises a microprocessor and a cache connected to the microprocessor. In one embodiment, CPU 11 includes a microprocessor, a co-processor, a cache, and a cache controller for handling access to the cache by the microprocessor. In a further embodiment, the elements mentioned above may reside on a single semiconductor substrate. In other embodiments, more or fewer than the elements mentioned above may be included in CPU 11.

Computer system 10 also includes DRAMs 14a and 14b and a DRAM controller 20. DRAMs 14a–14b are DRAM arrays and DRAM 14a represents the odd DRAM array and DRAM 14b represents the even DRAM array. In alternative embodiments, DRAMs 14a and 14b may be replaced with other types of volatile memories and DRAM controller 20 may be replaced with other types of memory controllers. In alternative embodiments, computer system 10 may have more or fewer than two memory arrays.

DRAM controller 20 controls access to DRAMs 14a–14b. CPU 11 therefore can access DRAMs 14a–14b via DRAM controller 20. The data read from DRAMs 14a–14b can be forwarded to CPU 11 via a data path 13 and host bus 16. In one embodiment, DRAM controller 20 is a dual ported memory controller, which will be described in more detail below.

Computer system 10 also includes a system bus 17 and a system bus controller 12. System bus controller 12 is coupled to system bus 17 to control the activities on system bus 17. System bus controller 12 also controls the system access to DRAMs 14a–14b via DRAM controller 20. System bus controller 12 is a system master. In alternative embodiments, system bus 17 may be connected to more than one system master.

System bus 17 is also connected to a system slave 15. A system slave only accepts cycles from various masters. A system master can generate memory or I/O cycles. In alternative embodiments, system bus 17 may be connected to more than one system slave. FIG. 1 only illustrates one system master and one system slave for illustration purposes. In practice, many more system masters and slaves can be connected to system bus 17.

System bus controller 12 controls the system devices (i.e., system masters and slaves) connected to system bus 17 to access DRAMs 14a–14b via DRAM controller 20. System bus controller 12 also acts as gateway for CPU 11 to access system slave 15 connected to system bus 17 via DRAM controller 20.

As described above, DRAM controller 20 is a dual ported memory controller. DRAM controller 20 includes two ports (i.e., address gateways). Port 19 is connected to CPU 11 via host bus 16. Port 19 (hereinafter referred to as "host port" 19) provides a path for CPU 11 to DRAMs 14a–14b and to system bus 17 via system bus controller 12.

Port 29 DRAM controller 20 is connected to system bus controller 12 via system bus 17. Port 29 (hereinafter referred to as "system port 29") is exclusively used by the system devices coupled to system bus 17. This port of DRAM controller 20 acts as the gateway to and from system bus 17.

The host port 19 of DRAM controller 20 is capable of accepting a host address and host cycle definition at one time. From the address and cycle definition, DRAM controller 20 determines if the cycle is bound for DRAMs 14a–14b or for the system devices coupled to system bus 17. If the cycle is bound for DRAMs 14a–14b, DRAM controller 20 executes a DRAM access cycle. If the cycle is not bound for DRAMs 14a–14b, DRAM controller 20 forwards the cycle to system bus controller 12.

The system port 29 of DRAM controller 20 is capable of sending as well as receiving address and system bus cycle definitions. The system port 29 accepts a system bus cycle and decodes if the system bus cycle is for DRAMs 14a–14b or not. If the system bus cycle includes an address for a memory location in DRAMs 14a–14b, DRAM controller 20 executes a DRAM access cycle. When DRAM controller 20 receives addresses and cycle definitions from host bus 16 and system bus 17 at the same time, DRAM controller 20 arbitrates among the requests and executes the winner of the arbitration.

The dual port architecture of DRAM controller 20 allows the host bus activities to be isolated from the system bus activities. This allows CPU 11 to access DRAMs 14a–14b at the same time the system bus activity is occurring. This reduces CPU access time to DRAMs 14a–14b significantly. When CPU 11 decides to access system slave 15, CPU 11 generates a host-to-system cycle in which control signals and addresses are sent to DRAM controller 20. DRAM controller 20 executes the cycle by passing the signals and the addresses to system bus controller 12. System bus controller 12 then converts the signals into its system protocol.

DRAMs 14a–14b are coupled to data path 13. Data path 13 also connected to host bus 16 and to system bus 17. Data path 13 is to transfer data read from DRAMs 14a–14b to one of buses 16–17, and to transfer data written into DRAMs 14a–14b from either bus 16 or bus 17. In one embodiment, data path 13 is implemented by a plurality of buffers. Data path 13 is controlled by DRAM controller 20, CPU 11, and system bus controller 12.

Computer system 10 also includes a clock source 18. Clock source 18 generates a clock signal ICLK2. The ICLK2 clock signal is supplied to DRAM controller 20.

Computer system 10 can be a synchronous system in which CPU 11, DRAM controller 20, and system bus controller 12 operate synchronously with each other. Computer system 10 can also be an asynchronous system in which CPU 11, DRAM controller 20, and system bus controller 12 operate asynchronously with each other. When computer system 10 is a synchronous system, CPU 11, DRAM controller 20, and system bus controller 12 all operate synchronously with a clock signal of the computer system. When computer system 10 is not a synchronous system, CPU 11, DRAM controller 20, and system bus controller 12 each may operate synchronously with independent clock signals.

DRAM controller 20 frequently performs a memory refresh operation to DRAMs 14a–14b in order to preserve the data stored in DRAMs 14a–14b. DRAM controller 20 is responsible for activating and controlling the refresh operation to DRAMs 14a–14b. When the memory refresh is needed, DRAM controller 20 first determines if a current owner such as CPU 11 or a system device is accessing of DRAM controller 20 is accessing DRAMs 14a–14b. If the current owner of DRAM controller 20 does not access DRAMs 14a–14b, DRAM controller 20 then activates the memory refresh to DRAMs 14a–14b. In this case, DRAM controller 20 performs the memory refresh operation to DRAMs 14a–14b concurrently with the handling of the non-memory access request from the current owner of DRAM controller 20. DRAM controller 20 does not need to cause the current owner to be held off in wait states during the memory refresh to DRAMs 14a–14b when the current owner issues the non-memory access request to DRAM controller 20. In addition, the refresh operation is not detected by the current owner.

When the current owner of DRAM controller 20 issues a memory access request to DRAM controller 20 at the same time that DRAM controller 20 generates a refresh request, DRAM controller 20 then stores the memory generated refresh request into a refresh request queue. When DRAM controller 20 completes the memory access operation for the current owner, the DRAM controller 20 then executes the refresh request out of the refresh request queue.

Figure 3:
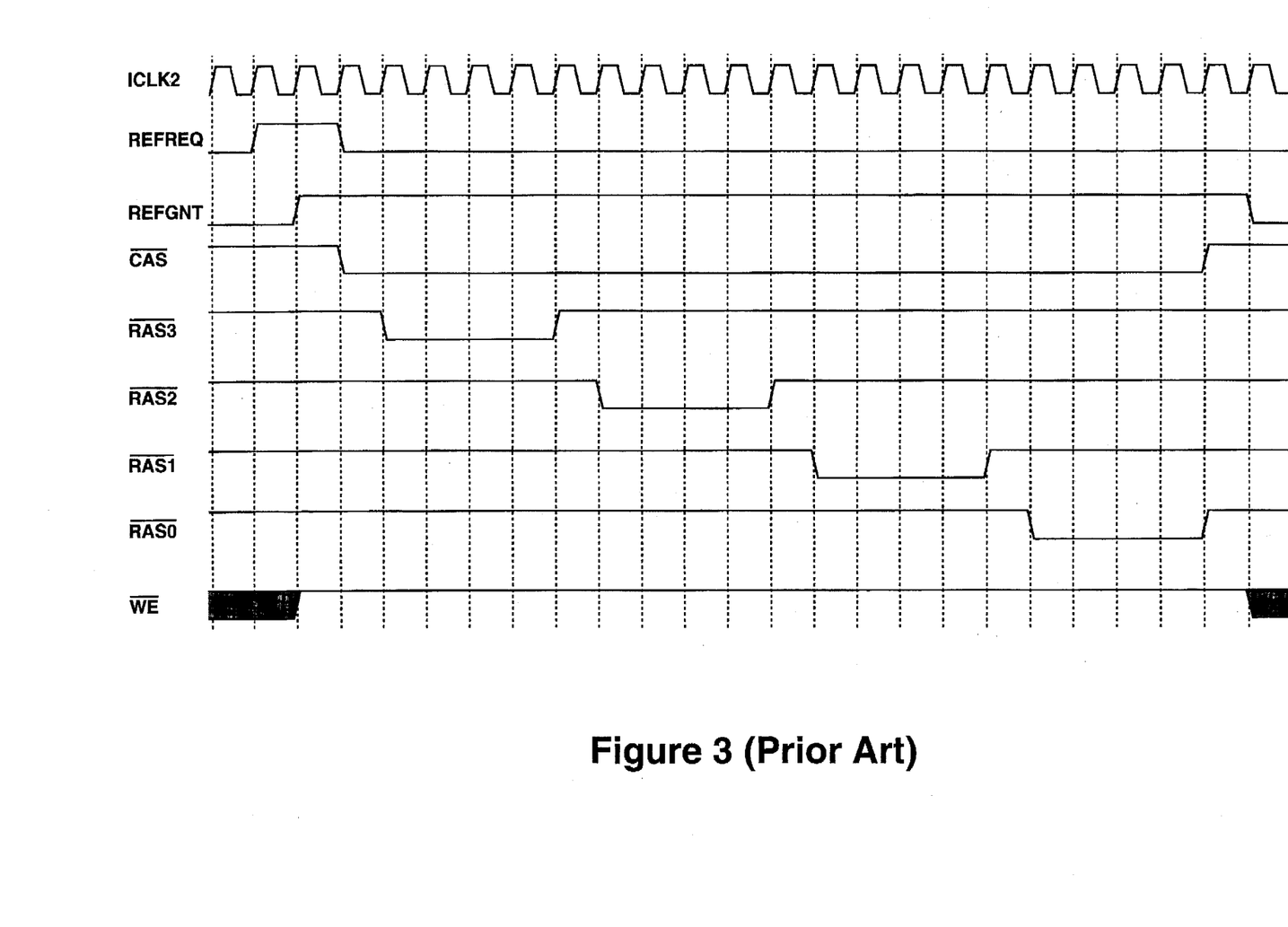
FIG. 3 is a timing diagram of a prior art refresh operation.
Figure 4:
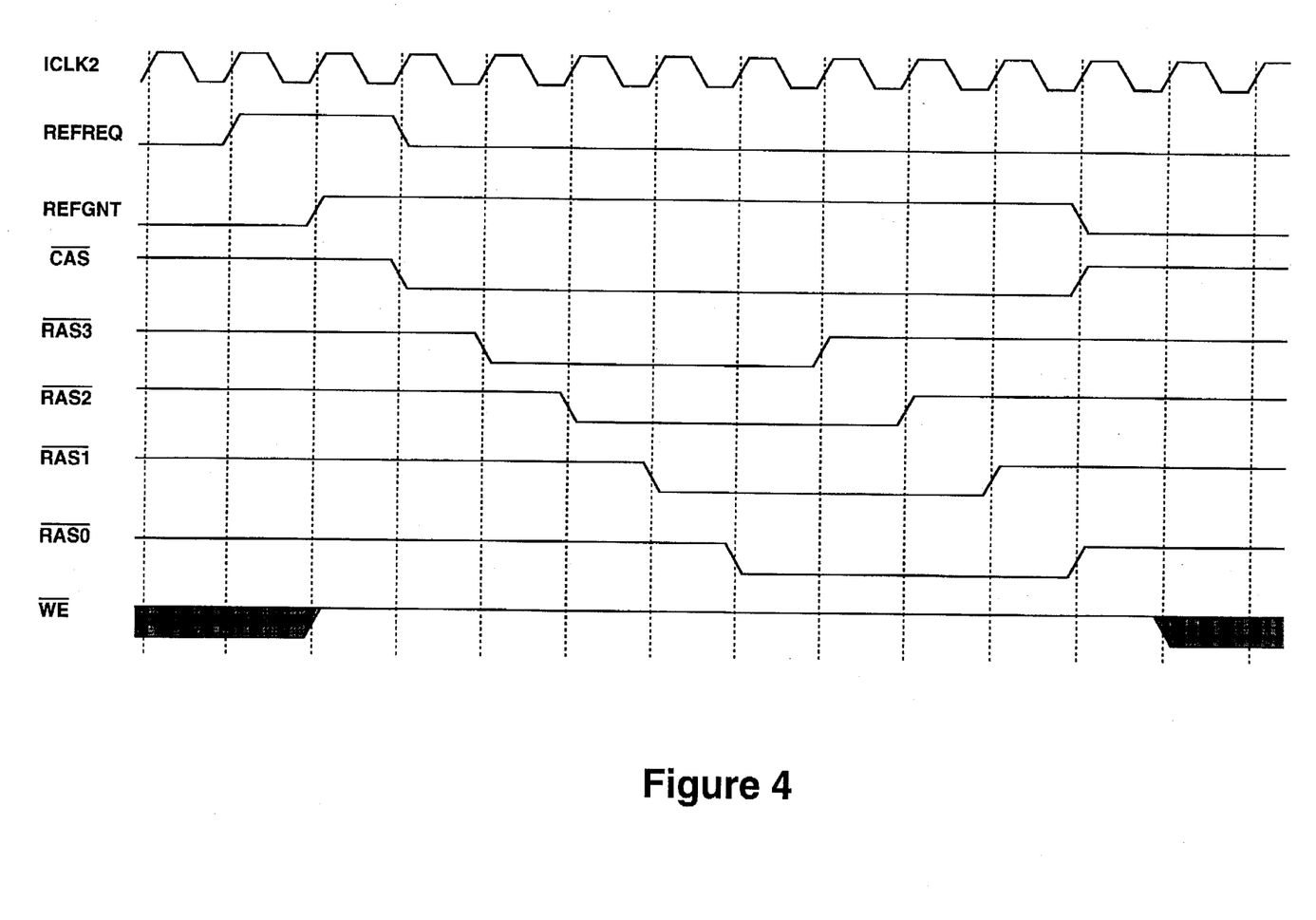
FIG. 4 is a timing diagram of a refresh operation that is implemented by the DRAM controller in accordance with an embodiment of the present invention.

By providing the concurrent memory refresh, the system performance of computer system 10 is increased. By queuing up the refresh requests during a memory access operation and executing the refresh cycles when the memory access operation is complete, the system performance and reliability of computer system 10 is increased. In addition, DRAM controller 20 employs a parallel $\overline{CAS}$ (i.e., Column Address Strobe) Before $\overline{RAS}$ (i.e., Row Address Strobe) refresh mode. This parallel $\overline{CAS}$-Before-$\overline{RAS}$ refresh mode allows DRAM controller 20 to complete a refresh cycle in five clock pulses, which significantly reduces the time for a refresh operation. As is known, a serial $\overline{CAS}$-Before-$\overline{RAS}$ refresh cycle, however, typically takes ten clock pulses to complete. The timing diagram of a serial $\overline{CAS}$-Before-$\overline{RAS}$ refresh cycle is shown in FIG. 3. The timing diagram of a parallel $\overline{CAS}$-Before-$\overline{RAS}$ refresh cycle is shown in FIG. 4.

The reduction in time for the refresh cycle decreases the impact of the memory refresh on the system performance of computer system 10. It also allows the refresh cycle to occur in a relatively narrow time slot, which makes it possible for DRAM controller 20 to activate the refresh operation between two memory access operations. Moreover, the reduced refresh time also makes it possible for DRAM controller 20 to generate the refresh cycle concurrently with the handling of a non-memory access request in DRAM controller.

Figure 2:
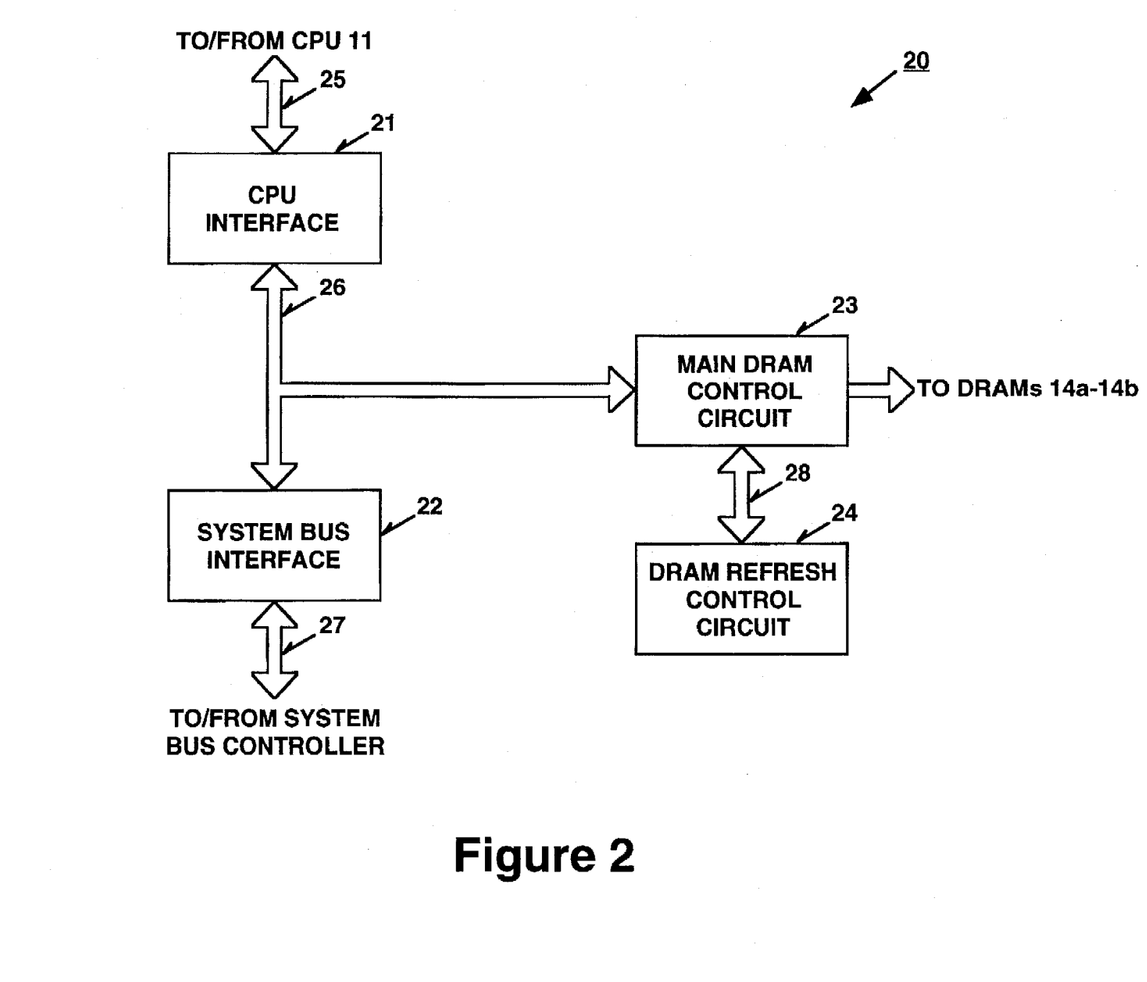
FIG. 2 is a block diagram of the DRAM controller that includes a refresh control circuit.

FIG. 2 illustrates in block diagram form DRAM controller 20 that includes a DRAM refresh control circuit 24 that allows DRAM controller 20 to concurrently refresh DRAMs 14a–14b (FIG. 1) while handling a non-memory access request. Thus, the current owner of DRAM controller 20 is not be held off during the concurrent refresh operation.

As can be seen from FIG. 2, DRAM controller 20 includes an interface circuit, including both a CPU interface 21, a system bus interface 22 and, a main DRAM control circuit 23, and DRAM refresh control circuit 24. A bus 26 is connected among CPU interface 21, system bus interface 22, and a main DRAM control circuit 23. Alternatively, DRAM refresh control circuit 24 may be connected directly to bus 26. Additionally, DRAM refresh control circuit 24 is connected to main DRAM control circuit 23.g5.

CPU interface 21 is used to interface the main DRAM control circuit 23 with CPU 11 (FIG. 1) via buses 25 and 26. System bus interface 22 is used to interface the main DRAM control circuit 23 with system bus controller 12 (FIG. 1) via buses 26 and 27. In addition, CPU interface 21 and system bus interface 22 interface with each other via bus 26. Main DRAM control circuit 23 interfaces with DRAMs 14a–14b (FIG. 1).

CPU interface 21 can receive the memory access request or the system bus access request (i.e., a non-memory access request) from CPU 11. When CPU interface 21 receives a request from CPU 11, it decodes the request to determine whether it is a memory access request or a system bus access request. If CPU interface 21 determines that the request is a memory access request, it then sends the memory access request to main DRAM control circuit 23 via bus 26. If the decoded request is a system bus access request, CPU interface 21 supplies the request to system bus interface 22.

System bus interface 22 may also receive a request that is either bound for DRAMs 14a–14b or CPU 11. If the request received at system bus interface 22 is bound for DRAMs 14a–14b, the request is then sent to main DRAM control circuit 23. If the request received at system bus interface 22 is not bound for DRAMs 14a–14b, i.e., a non-memory access request, the request is then sent to CPU interface 21.

Main DRAM control circuit 23 is used to control access to DRAMs 14a–14b. Main DRAM control circuit 23 generates control signals to apply row and column addresses to DRAMs 14a–14b. Main DRAM control circuit 23 receives the memory address from either CPU interface 21 or system bus interface 22 and decodes the memory address into appropriate row and column addresses.

Main DRAM control circuit 23 also performs a refresh operation to DRAMs 14a–14b upon receiving a refresh request. Main DRAM control circuit 23 is equipped with the parallel $\overline{CAS}$-Before-$\overline{RAS}$ refresh mode to refresh DRAMs 14a–14b. As can be seen from FIG. 4, during the parallel $\overline{CAS}$-Before-$\overline{RAS}$ refresh, the $\overline{CAS}$ signal is first made active. The $\overline{RAS3}$ signal is then made active at the next clock pulse. At the next clock pulse and before the $\overline{RAS3}$ signal is deasserted, the $\overline{RAS2}$ signal is asserted. Then the $\overline{RAS1}$ and $\overline{RAS0}$ signals follow suit.

Referring back to FIG. 2, main DRAM control circuit 23 receives the refresh request from DRAM refresh control circuit 24. DRAM refresh control circuit 24 generates the refresh request and applies the refresh request to main DRAM control circuit 23 if main DRAM control circuit 23 is not currently accessing DRAMs 14a–14b such that the memory refresh operation can be performed at the same time when CPU interface 21 or system bus interface 22 is handling a non-memory access request.

If main DRAM control circuit 23 is accessing DRAMs 14a–14b when DRAM refresh control circuit 24 generates the refresh request, DRAM refresh control circuit 24 puts the refresh request in a refresh request queue (not shown in FIG.

2). When main DRAM control circuit 23 finishes the memory access operation, DRAM refresh control circuit 24 then provides the refresh request to main DRAM control circuit 23 from the refresh request queue. In this case, the refresh request will not be lost and the refresh operation can still be performed. The DRAM refresh control circuit 24 will be described in more detail below, in conjunction with FIG. 5.

By having DRAM refresh control circuit 24, DRAM controller 20 is able to provide a concurrent refresh operation when DRAM controller 20 is handling a non-memory access request.

Figure 5:
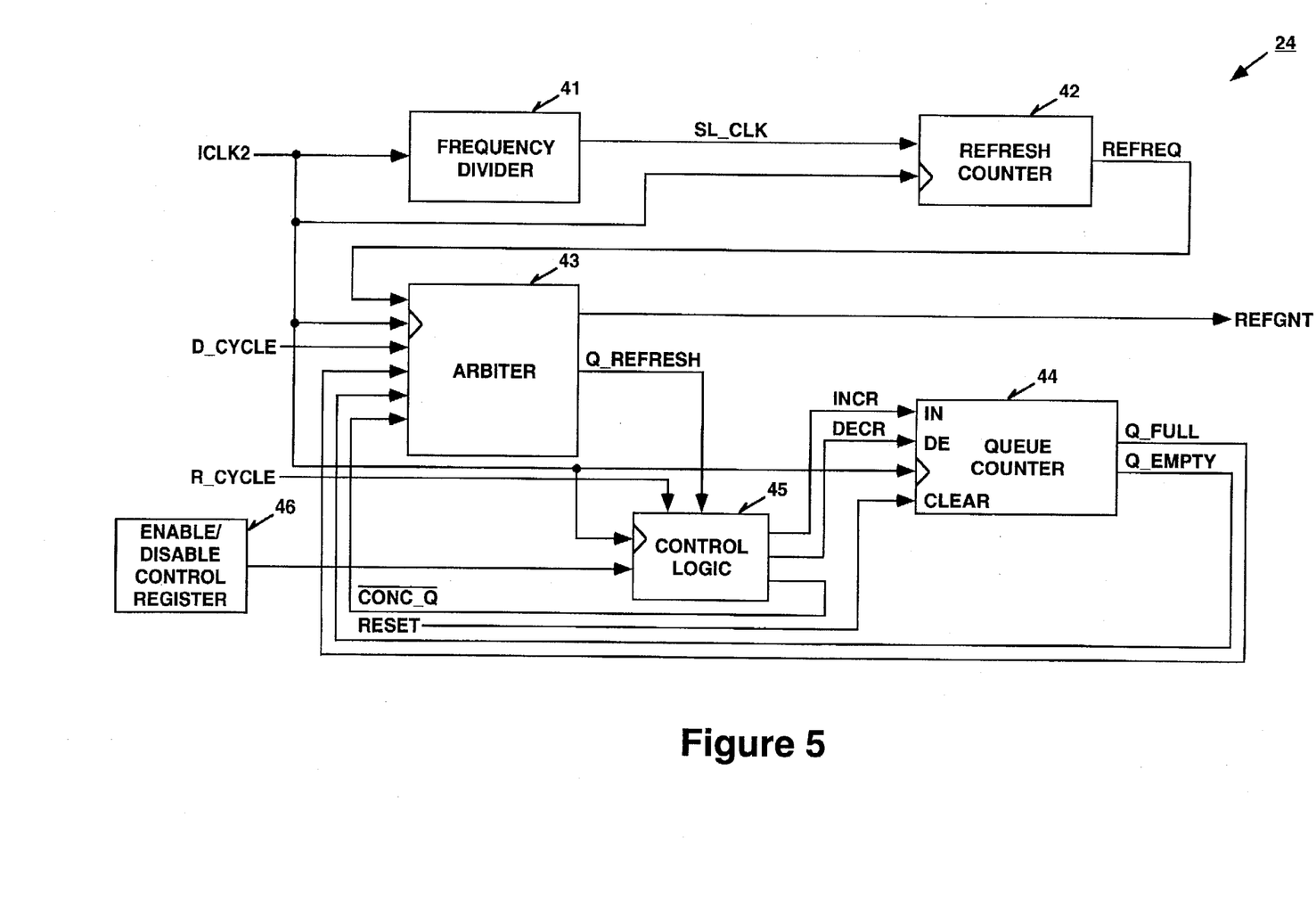
FIG. 5 is a circuit diagram of the refresh control circuit of FIG. 2.

Referring to FIG. 5, DRAM refresh control circuit 24 includes a refresh counter 42 that generates a refresh request REFREQ signal periodically to an arbiter 43. Refresh counter 42 is triggered by an SL_CLK signal from a frequency divider 41. Frequency divider 41 receives the system ICLK2 clock signal from clock source 18 of FIG. 1. Frequency divider 41 then divides the ICLK2 clock signal into the SL_CLK signal. In one embodiment, the SL_CLK signal generated by divider 41 is eight times slower than the ICLK2 clock signal.

Refresh counter 42 also receives the ICLK2 clock signal. The SL_CLK signal is synchronized to the ICLK2 clock signal at counter 42.

Refresh counter 42 periodically activates the refresh request signal REFREQ. In one embodiment, refresh counter 42 activates the REFREQ signal at every 15 microseconds. In alternative embodiments, refresh counter 42 can activate the REFREQ signal at more or less than 15 microseconds.

Arbiter 43 receives the REFREQ signal. In addition, arbiter 43 receives the ICLK2 clock signal and a DRAM cycle D_CYCLE signal. Arbiter 43 receives the D_CYCLE signal from main DRAM control circuit 23. The D_CYCLE signal indicates whether main DRAM control circuit 23 is currently performing a memory access operation. If main DRAM control circuit 23 is performing a memory access operation, the D_CYCLE signal is asserted by main DRAM control circuit 23. If not, main DRAM control circuit 23 does not assert the D_CYCLE signal. Arbiter 43 also receives a CONC_Q signal, a Q_FULL signal, and a Q_EMPTY signal.

DRAM refresh control circuit 24 also includes a queue counter 44 and a control logic 45. Queue counter 44 is used in refresh control circuit 24 to store the number of the refresh requests that were unable to be sent to main DRAM control circuit 23, during the memory access operation. Control logic 45 is used to enable/disable the concurrent refresh scheme implemented by refresh control circuit 24. When control logic 45 is enabled, the outputs of queue counter 44 are applied to arbiter 43. In addition, control logic 45 increments or decrements queue counter 44. When control logic 45 is disabled, arbiter 43 disregards the Q_FULL and Q_EMPTY signals from queue counter 44 and issues the refresh grant signal REFGNT to main DRAM control circuit 23 of FIG. 2 in response to the REFREQ signal from refresh counter 42 and D_CYCLE signal from main DRAM control circuit 23. Control logic 45 is enabled or disabled by an enable/disable data stored in a control register 46. The enable/disable data can be written into control register 46 by a software program. Both control logic 45 and queue counter 44 receive the ICLK2 clock signal. Therefore, DRAM refresh control circuit 24 is a synchronous system that is synchronized with the ICLK2 clock signal.

Control logic 45 generates the $\overline{CONC\_Q}$ signal. The $\overline{CONC\_Q}$ signal indicates to arbiter 43 whether the concurrent refresh scheme is enabled. Control logic 45 also generates an INCR signal and a DECR signal. The INCR signal is an increment signal that causes queue counter 44 to increment by one. The DECR signal is a decrement signal that causes queue counter 44 to decrement by one. Control logic 45 also receives a refresh cycle R_CYCLE signal from main DRAM control circuit 23 and a Q_REFRESH signal from arbiter 43. The R_CYCLE signal indicates that main DRAM control circuit 23 is currently undergoing a refresh operation. The Q_REFRESH signal indicates that arbiter 43 did not assert the REFGNT signal based on the asserted REFREQ signal and queue counter 44 needs to be incremented.

Queue counter 44 generates the Q_FULL and Q_EMPTY signals. The Q_FULL signal is active when queue counter 44 is full and the Q_EMPTY signal is active when queue counter 44 is empty. The content of queue counter 44 can be cleared by a RESET signal.

In one embodiment, when queue counter 44 counts sixteen, the Q_FULL signal is asserted. In alternative embodiments, the number to which queue counter 44 counts before asserting the Q_FULL signal may be larger or smaller than sixteen.

During operation, when control register 46 stores the enable data, control logic 45 asserts the $\overline{CONC\_Q}$ signal. When queue counter 44 is empty, the Q_EMPTY signal is asserted and arbiter 43 generates the REFGNT signal based on the REFREQ signal and the D_CYCLE signal. When refresh counter 42 asserts the REFREQ signal, arbiter 43 asserts the REFGNT signal to main DRAM control circuit 23 to refresh DRAMs 14a–14b when the D_CYCLE signal is inactive. This causes main DRAM control circuit 23 to refresh DRAMs 14a–14b. When this occurs, arbiter 43 does not assert the Q_REFRESH signal and the R_CYCLE signal is then made active. Control logic 45 then only asserts the DECR signal. Because queue counter 44 is empty at this time, the DECR signal is ignored.

When arbiter 43 receives an active REFREQ signal and an active D_CYCLE signal, arbiter 43 does not generate the REFGNT signal as main DRAM control circuit 23 (FIG. 2) is currently undergoing the memory access operation. In this situation, the concurrent refresh does not occur. Arbiter 43, instead, asserts the Q_REFRESH signal to control logic 45. The R_CYCLE signal is inactive. Control logic 45 then asserts the INCR signal to increment queue counter 44. In this case, the refresh request generated by refresh counter 42 is stored in queue counter 44 and the Q_EMPTY signal is deasserted.

As soon as the D_CYCLE signal goes inactive, arbiter 43 detects that queue counter 44 has stored at least one refresh request. At this time, the REFREQ signal can be active or inactive. If the REFREQ signal is inactive, arbiter 43 asserts the REFGNT signal but does not assert the Q_REFRESH signal. At this time, the concurrent refresh occurs. The R_CYCLE signal is then made active. Control logic 45 then asserts the DECR signal.

If the REFREQ signal is active when queue counter 44 is not full and not empty, arbiter 43 generates the REFGNT signal when the D_CYCLE signal is inactive and also generates the Q_REFRESH signal. The concurrent refresh occurs and the R_CYCLE signal is then made active. This causes control logic 45 not to assert both the INCR and DECR signals.

When the Q_FULL signal is made active, it indicates that queue counter 44 is full and a burst refresh is required. When this occurs, arbiter 43 generates the REFGNT signal until the Q_EMPTY signal is asserted. Arbiter 43 does this as soon as the D_CYCLE signal goes inactive.

When control register 46 stores a disable data, control logic 45 deasserts the $\overline{CONC\_Q}$ signal and arbiter 43 generates the REFGNT signal in accordance with the REFREQ and D_CYCLE signals. In this case, the concurrent refresh is disabled.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A memory controller for controlling access to a memory array, comprising:
   (A) an interface circuit operatively coupled to a microprocessor and at least one device to receive an access request from one of the microprocessor and said at least one device, the interface circuit determining whether the access request is a memory access request or a non-memory access request;
   (B) a memory control circuit coupled to the interface circuit, the memory control circuit controlling access to the memory array by the microprocessor and said at least one device;
   (C) a refresh control circuit coupled to the memory control circuit, the refresh control circuit causing the memory control circuit to refresh the memory array concurrently with the interface circuit receiving the non-memory access request, wherein the refresh control circuit further comprises:
      (i) a refresh counter that periodically generates a refresh request;
      (ii) an arbiter coupled to the refresh counter and the memory control circuit, the arbiter determining when the memory array is to be refreshed;
      (iii) a refresh request queue coupled to the arbiter, the refresh request queue having stored therein a refresh request count when the refresh counter generates the refresh request and the arbiter determines that the memory control circuit is concurrently accessing the memory array.

2. The memory controller of claim 1, wherein when the refresh request queue becomes full, the arbiter causes the memory control circuit to refresh the memory array.

3. The memory controller of claim 1, wherein the refresh request queue is a counter.

4. The memory controller of claim 1, wherein the arbiter coupled to the refresh counter and the memory control circuit causes the memory control circuit to refresh the memory array when the arbiter determines that the memory control circuit is not accessing the memory array and the refresh counter generates the refresh request.

5. The memory controller of claim 1, wherein the refresh request queue applies the refresh request count stored in the refresh request queue back to the arbiter such that when the arbiter determines that the memory control circuit is no longer accessing the memory array, the arbiter causes the memory control circuit to refresh the memory array in response to the refresh request count stored in the refresh request queue.

6. The memory controller of claim 2, wherein the arbiter causes the memory control circuit to refresh the memory array until the refresh request queue is empty.

7. The memory controller of claim 3, wherein the refresh control circuit further comprises a control logic, the control logic incrementing the counter in response to the refresh counter generating the refresh request concurrently with the memory control circuit accessing the memory array, and decrementing the counter when the arbiter causes the memory control circuit to refresh the memory array in response to the refresh request count stored in the counter.

8. A computer system, comprising:
   (A) a microprocessor;
   (B) a memory array;
   (C) a plurality of devices;
   (D) a memory controller operatively coupled to (1) the memory array, (2) the microprocessor, and (3) the plurality of devices for controlling access to the memory array, wherein the memory controller further comprises:
      (i) an interface circuit operatively coupled to the microprocessor and the plurality of devices to receive an access request from one of the microprocessor and the plurality of devices, the interface circuit determining whether the access request is a memory access request or a non-memory access request;
      (ii) a memory control circuit coupled to the interface circuit, the memory control circuit controlling access to the memory array by the microprocessor and the plurality of devices;
      (iii) a refresh control circuit coupled to the memory control circuit, the refresh control circuit causing the memory control circuit to refresh the memory array concurrently with the interface circuit receiving the non-memory access request, wherein the refresh control circuit further comprises:
         (a) a refresh counter that periodically generates a refresh request;
         (b) an arbiter coupled to the refresh counter and the memory control circuit, the arbiter determining when the memory array is to be refreshed;
         (c) a refresh request queue coupled to the arbiter, the refresh request queue having stored therein a refresh request count when the refresh counter generates the refresh request and the arbiter determines that the memory control circuit is concurrently accessing the memory array.

9. The computer system of claim 8, wherein when the refresh request queue becomes full, the arbiter causes the memory control circuit to refresh the memory array.

10. The computer system of claim 8, wherein the refresh request queue is a counter.

11. The computer system of claim 8, wherein the arbiter coupled to the refresh counter and the memory control circuit causes the memory control circuit to refresh the memory array when the arbiter determines that the memory control circuit is not accessing the memory array and the refresh counter generates the refresh request.

12. The computer system of claim 8, wherein the refresh request queue applies the refresh request count stored in the refresh request queue back to the arbiter such that when the arbiter determines that the memory control circuit is no longer accessing the memory array, the arbiter causes the memory control circuit to refresh the memory array in response to the refresh request count stored in the refresh request queue.

13. The computer system of claim 9, wherein the arbiter causes the memory control circuit to refresh the memory array until the refresh queue is empty.

14. The computer system of claim 10, wherein the refresh control circuit further comprises a control logic, the control logic incrementing the counter in response to the refresh counter generating the refresh request concurrently with the memory control circuit accessing the memory array, and decrementing the counter when the arbiter causes the memory control circuit to refresh the memory array in response to the refresh request count stored in the counter.

* * * * *